(12) United States Patent
Vialén et al.

(10) Patent No.: US 7,366,496 B2
(45) Date of Patent: Apr. 29, 2008

(54) METHOD OF CHECKING AMOUNT OF TRANSMITTED DATA

(75) Inventors: Jukka Vialén, Espoo (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 325 days.

(21) Appl. No.: 09/958,301

(22) PCT Filed: Feb. 20, 2001

(86) PCT No.: PCT/FI01/00165

§ 371 (c)(1),
(2), (4) Date: Dec. 20, 2001

(87) PCT Pub. No.: WO01/63853

PCT Pub. Date: Aug. 30, 2001

(65) Prior Publication Data

US 2002/0159444 A1 Oct. 31, 2002

(30) Foreign Application Priority Data

Feb. 22, 2000 (FI) .................................. 20000407
Feb. 25, 2000 (FI) .................................. 20000444

(51) Int. Cl.
*H04M 1/66* (2006.01)
(52) U.S. Cl. .................................................... 455/410
(58) Field of Classification Search ................ 370/231, 370/232, 235, 236, 252, 278, 310.2, 328, 370/338, 389, 394; 455/405, 406, 410, 411
See application file for complete search history.

(56) References Cited

U.S. PATENT DOCUMENTS

| | | | |
|---|---|---|---|
| 5,345,595 A * | 9/1994 | Johnson et al. ............. | 455/410 |
| 5,978,669 A | 11/1999 | Sanmugam | |
| 6,182,142 B1 * | 1/2001 | Win et al. .................... | 709/229 |
| 6,185,416 B1 * | 2/2001 | Rudokas et al. ............ | 455/410 |
| 6,219,538 B1 * | 4/2001 | Kaminsky et al. .......... | 455/410 |
| 6,295,446 B1 * | 9/2001 | Rocha ......................... | 455/410 |
| 6,311,054 B1 * | 10/2001 | Korpela ....................... | 455/406 |
| 6,631,119 B1 * | 10/2003 | Mawhinney et al. ........ | 370/252 |
| 2004/0233853 A1 * | 11/2004 | Law et al. ................... | 370/242 |

FOREIGN PATENT DOCUMENTS

| | | |
|---|---|---|
| JP | 57-84646 | 5/1982 |
| JP | 57-113658 | 7/1982 |
| JP | 4-369135 | 12/1992 |
| JP | 5-153162 | 6/1993 |
| JP | 2001069955 | 3/2001 |
| WO | WO 99/49688 | 9/1999 |
| WO | WO 00/30398 | 5/2000 |

* cited by examiner

Primary Examiner—Anh-Vu H. Ly
(74) Attorney, Agent, or Firm—Pillsbury Winthrop Shaw Pittman LLP; Larry J. Hume (57) ABSTRACT

During a connection between a network infrastructure and user equipment a first indication of the amount of data transmitted over the connection is maintained in the network infrastructure and a second indication of the amount data transmitted is maintained in the user equipment. A checking procedure is triggered in response to encountering a predetermined checking value. The checking procedure utilizes integrity protected signalling. During the checking procedure the first indication is compared with the second indication.

20 Claims, 3 Drawing Sheets

METHOD OF CHECKING AMOUNT OF TRANSMITTED DATA

This is a National Stage Application of International Application No. PCT/F101/00165 which was filed on Feb. 20, 2001 in the English language.

FIELD OF THE INVENTION

The invention relates to checking the amount of data transmitted in communication systems, and particularly in wireless communication systems where unciphered user data can be transmitted over the air interface.

BACKGROUND OF THE INVENTION

Wireless communication systems refer generally to any telecommunication system which enables wireless communication between the users and the network. In mobile communication systems users are capable of moving within the coverage area of the network. A typical mobile communications system is a public land mobile network (PLMN). The present invention can be used in different mobile communication systems, such as Universal Mobile Communication system (UMTS) and IMT-2000 (International Mobile Telecommunication 2000). In the following, the invention is described by way of example with reference to UMTS, more specifically to the UMTS system being specified in the $3^{rd}$ generation partnership project 3GPP, without restricting the invention to it.

Information, such as control signalling and user data, is exchanged between a mobile station and the network infrastructure by means of data packets. Each data packet comprises at least a header and a data portion. The header may comprise an address for routing the data packet. When data is transmitted unciphered, the address can be changed, especially when the address is of IP-type (Internet Protocol) and the data transmission involves certain security problems.

Figure 1:
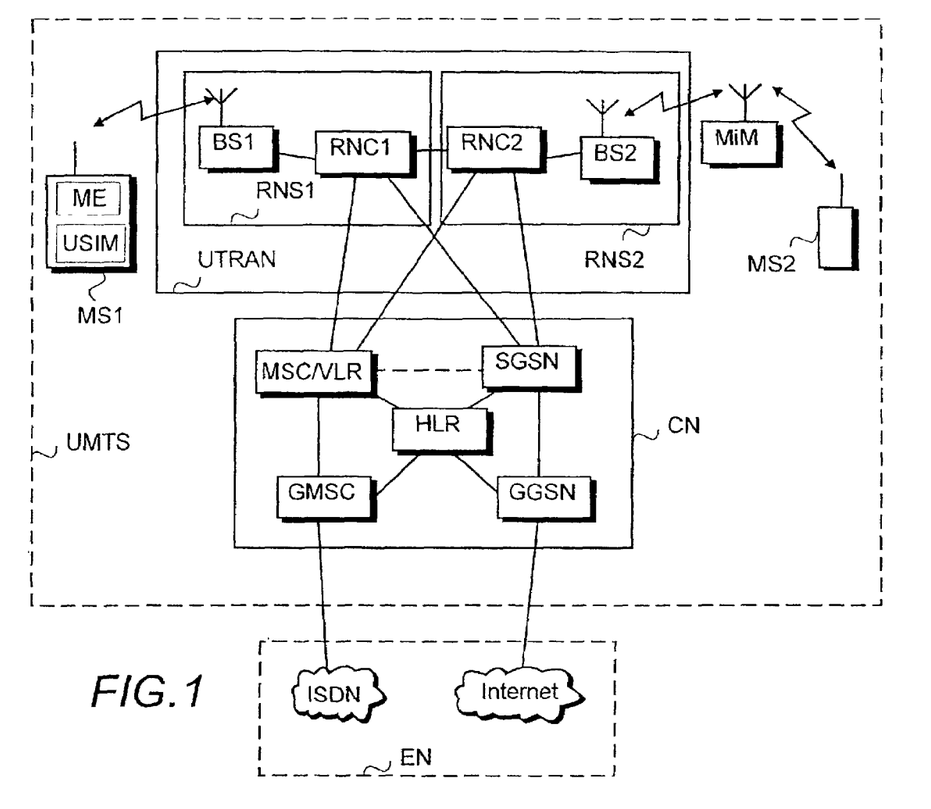
FIG. 1 shows a simplified UMTS architecture.

FIG. 1 illustrates a situation where a third party MiM, a "man-in the-middle", interferes with radio communication between mobile station MS2 and the network infrastructure over the air interface. In the present application the third party is referred to as an intruder. This term covers all kinds of unauthorized interference with communication over the air interface irrespective of whether the purpose of the interference is eavesdropping, disturbing communications by modifying, deleting, re-ordering, replaying, spoofing, or any other unexceptional operation. The intruder may for example interfere with unciphered radio communication by transmitting unauthorized copies of messages transmitted via a radio connection, change addresses of data packets sent from the mobile station MS2, filter data packets or send false messages and interfere with communication integrity.

The intruder MiM represents the network infrastructure (a base station BS2 and RNC2, i.e. RNS2, which are described below in FIG. 1), for the mobile station MS2 (the target user) and simultaneously represents a mobile station MS2 for the network infrastructure (the genuine base station BS2 (and RNC2)). The intruder MiM can take a passive role and simply eavesdrop the messages. The major problem is that the unciphered connection enables the intruder MiM to modify headers allowing the intruder to send and/or receive its own data over the connection of the MS2 without the mobile station MS2 (and the network side) noticing this. The intruder MiM simply lets all packets from MS2 go through and only modifies the headers of the packets (mainly protocol data unit PDU numbers) in order to be able to send its packets between packets sent from MS2. For downlink packets the intruder MiM filters its own packets off the data stream and lets packets to the MS2 go through with modified headers Thus the user of the MS2 does not notice the intruder and does not know that he has to pay also for the intruder's packets. The user of MS2 can notice this only afterwards from his bill.

One solution to this major problem is to authenticate each single data packet (message) by verifying the integrity of the data packet. This authentication is often called integrity protection and usually it does not include protection of confidentiality of the transmitted data. packets. To protect the integrity of a data packet, the sending party computes a message authentication code MAC-I value according to a predefined algorithm and appends it to the data packet before sending it. A MAC-I is typically a relatively short bit string, which depends on the data packet (message) to which it is appended and on a secret key known both by the sender and by the receiver of the data packet. The receiving party recomputes an XMAC-I value based (typically) on the message and the secret key according to the predefined algorithm, and compares the received MAC-I and the calculated XMAC-I. If they match, the receiver can trust that the data packet (message) is intact and sent by the supposed party.

The problem in the integrity protection is increased overhead in communication. Typically, the MAC-I value should be long enough to reduce the probability of guessing it right to a sufficiently low level compared with the benefit gained by one successful forgery. For example, using a 32-bit MAC-I value reduces the probability of a correct guess to 1/4 294 967 296, which is small enough for most applications. At the radio interface, however, 32 extra bits per packet is considered as a significant overhead and should be avoided whenever possible. That is why in UMTS, for instance, the integrity protection by added MAC-Is is applied only to signalling (on the control plane). When applying the integrity protection only to signalling, the intruder can modify the user data, and especially the headers, and send/receive his own data so that it is charged from the legal target user MS2. A similar problem may be encountered in any telecommunications system in which unciphered data transmission in the air interface is possible.

BRIEF DESCRIPTION OF THE INVENTION

An object of the invention is to provide a method and an apparatus implementing the method to find out in an early stage an intruder sending and/or receiving its own data over the connection. The object is achieved with a method, a system, a network element and a user equipment which are characterized in what is disclosed in the independent claims. The preferred embodiments of the invention are set forth in the dependent claims.

The invention is based on the idea to count on the network side and in the user equipment (mobile station) the amount of data transmitted and periodically check whether or not the amounts on both sides are the same. 'Data transmitted' refers here to data received and/or sent. The information needed in the checking procedure is changed between the user equipment (mobile station) and the network in messages which are integrity-protected. This invention shows that even in the case where integrity protection is not applied to the user plane it is possible to utilize integrity protection on the control plane to encounter the intruder. An advantage of the invention is that the intruder sending and/or receiving its data over the connection is revealed in very early stage. Another advantage is that the user equipment (mobile station) and the network node can locally authenticate each other periodically based on the amount of data sent during the connection. The invention also enables the operator to charge the legal user only for his data traffic and not for the intruder's data traffic.

In a preferred embodiment of the invention it is deduced on the basis of the comparison whether or not to release the connection. This has the advantage that the intruder cannot any more use the connection if the comparison reveals that there is an intruder.

In another preferred embodiment of the invention the checking procedure is triggered in the network infrastructure. This has the advantage that the checking values need not be sent to the user equipment (mobile station).

Yet in another preferred embodiment of the invention the checking procedure can be triggered in the user equipment (mobile station). This has the advantage that if the intruder sends data only to the user equipment (mobile station) and/or the user equipment (mobile station) runs for example an application which serves a legitimate remote user, the checking procedure is still triggered.

Still in another preferred embodiment of the invention after the user equipment (mobile station) has encountered the checking value, the user equipment (mobile station) waits a predetermined time for a message indicating that the checking procedure is triggered in the network infrastructure and only if the user equipment (mobile station) does not receive the message during the predetermined time it triggers the checking procedure. This has the advantage that the checking procedure is not triggered twice at the same time.

BRIEF DESCRIPTION OF THE FIGURES

The invention will be described in greater detail by means of preferred embodiments with reference to the accompanying figures, in which.

DETAILED DESCRIPTION OF THE INVENTION

The preferred embodiments of the invention are described in the following as implemented in the third generation mobile system UMTS. However, the aim is not to restrict the invention to these embodiments. The invention is applicable to any telecommunications system in which unciphered user data can be transmitted over the air interface. Other examples of such systems are IMT-2000, IS-41, GSM (Global System for Mobile communications), or corresponding mobile systems, such as the PCS (Personal Communication System) or the DCS 1800 (Digital Cellular System for 1800 MHz). The specifications of mobile communication systems in general and of the IMT-2000 and UMTS systems in particular evolve rapidly. This evolution may require extra changes to the invention. Therefore, all terms and expressions should be interpreted as widely as possible and they are intended to describe and not to limit the invention. It is the function that is essential for the invention and not in which network element or apparatus it is executed.

FIG. 1 shows a simplified UMTS architecture illustrating only the parts essential to the invention, although it is apparent to a person skilled in the art that a common mobile telephone system also comprises other functions and structures, which need not be discussed in greater detail here. The main parts of the UMTS are: a core network CN, a UMTS terrestrial radio access network UTRAN, and a mobile station MS1, MS2, also called a user equipment UE. The interface between the core network CN and UTRAN is called the Iu interface, and the air interface between UTRAN and the mobile station MS is called the Uu interface. The Uu interface is a radio interface.

UTRAN consists of a set of radio network subsystems RNS1, RNS2 (also called radio access networks) connected to the core network CN over the Iu-interface. Each RNS is responsible for the resources of its cells. A radio network subsystem RNS consists of a radio network controller RNC, and a multiplicity of base stations BS. The interface between two radio network subsystems RNSs is called the Iur interface. The interface between the radio network controller RNC and the base station BS is called the Iub interface.

The radio network controller RNC1, RNC2 is the network node responsible for the control of the radio resources of UTRAN. It interfaces the core network CN and also terminates the RRC protocol (Radio Resource Control) that defines the messages and procedures between the mobile and UTRAN. It logically corresponds to a base station controller in GSM systems. On each connection between a mobile station MS1 and UTRAN, one RNC is a serving RNC. As shown in FIG. 1, RNC is connected to two CN nodes (MSC/VLR and SGSN). In some network topologies one RNC may be connected to one or more than two CN nodes which can be of similar or different type. In the future one RNC can for example be connected to several SGSNs.

The base stations BS1, BS2 are also called NodeB's. The main function of the base station BS is to perform the air interface layer 1 processing (channel coding and interleaving, rate adaptation, spreading, etc). It also performs some basic Radio Resource Management operations as the inner loop power control. Logically, it corresponds to a base transceiver station in GSM systems.

The core network CN can be connected to external networks EN, which can be either Circuit Switched (CS) networks (e.g. PLMN, PSTN, ISDN) or Packet Switched (PS) network (e.g. the Internet). The core network CN comprises a Home Location Register HLR, a Mobile Services Switching Centre/Visitor Location Register MSC/VLR, a Gateway MSC GMSC, a Serving GPRS (General Packet Radio Service) Support Node SGSN and a Gateway GPRS Support Node GGSN. The core network described here is based on the/a second generation GSM/GPRS network. Other types of core networks, for example IS-41, can comprise other network elements.

The mobile station MS can be a simplified terminal for speech only or it can be a terminal for diverse services acting as a service platform and supporting the loading and execution of various functions related to the services. A mobile station MS comprises actual mobile equipment ME and a detachably connected identification card USIM, also called a subscriber identity module. In this context, a mobile station MS (ie. user equipment) generally means the entity formed by the subscriber identity module and the actual mobile equipment. The subscriber identity module USIM is a smart card that holds the subscriber identity, performs authentication algorithms, and stores authentication and encryption keys and some subscription information that is needed at the mobile station. The mobile equipment ME is the radio terminal used for radio communication over the Uu interface between the mobile station MS and UTRAN. The mobile equipment can be any equipment capable of communicating in a mobile communication system or a combination of several pieces of equipment, for instance a multimedia computer to which a Nokia card phone has been connected to provide a mobile connection.

A system implementing the functionality of the present invention comprises not only means required for transmitting data and signalling according to prior art, but also means for maintaining on the network side a first indication of the amount of data transmitted, means for maintaining in the user equipment (mobile station) a second indication of data transmitted, means for triggering a checking procedure to find out if the values of the first indication and the second indication are the same. The system may also comprise means for further checking the values of the amount of data transmitted when the first indication is not the same as the second indication. The system may also comprise means for deciding whether the difference between the values is acceptable and means for releasing the connection in response to an unacceptable difference. No hardware changes are required in the structure of the system. It comprises processors and memory that can be utilized in the functions of the invention. All changes required for implementing the invention can be made as additional or updated software routines and/or by adding application-specific integrated circuit(s) (ASIC) in the network nodes and user equipment (mobile station)s taking part in the checking procedure.

Figure 3:
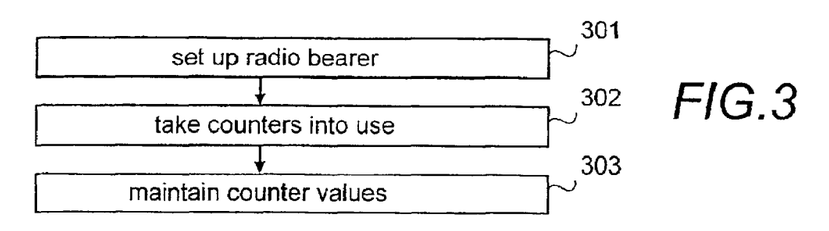
FIG. 3 is a flow chart illustrating the functionality of a user equipment and a network infrastructure according to the invention.
Figure 4:
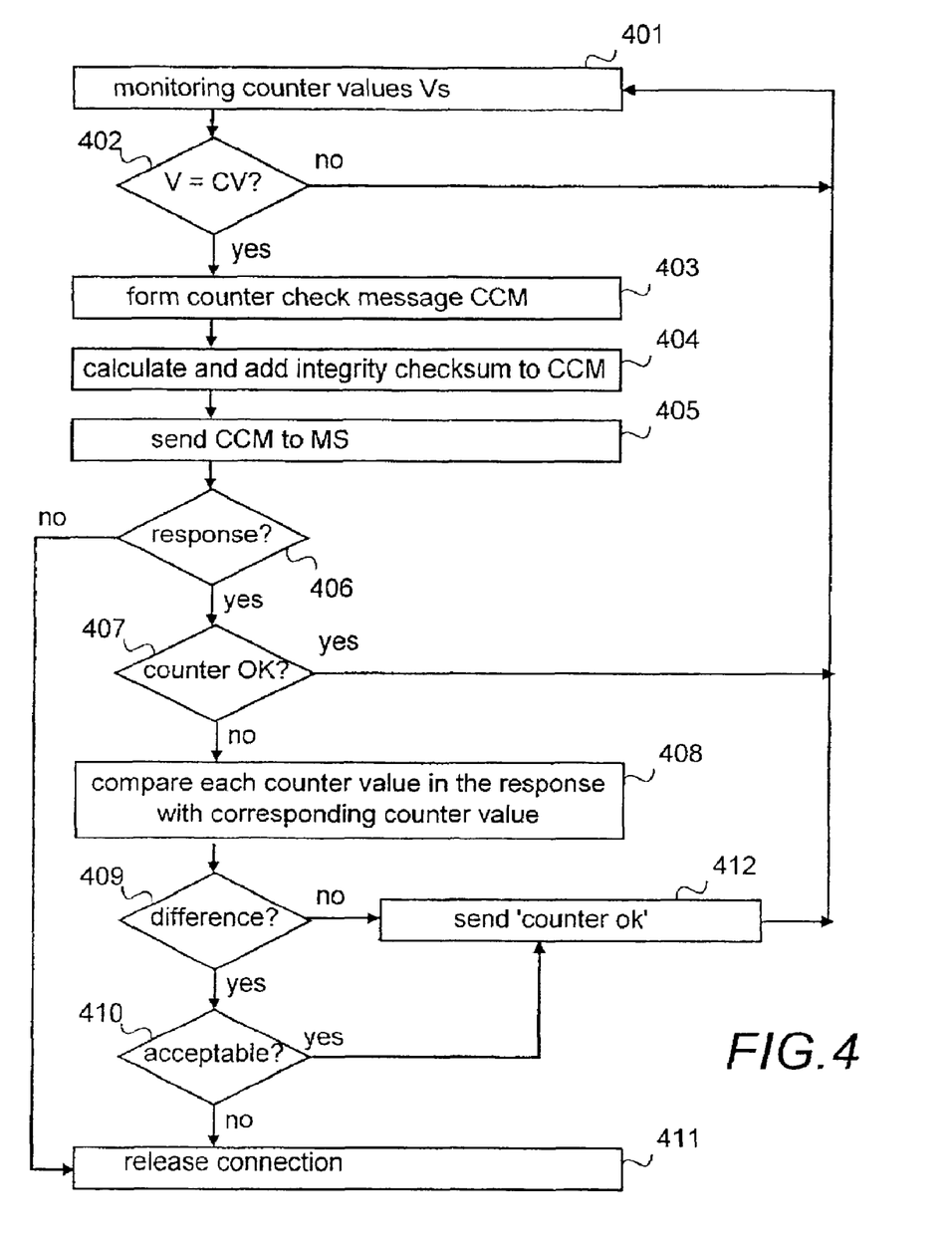
FIG. 4 is a flow chart illustrating the checking procedure in the network in a first preferred embodiment of the invention.
Figure 5:
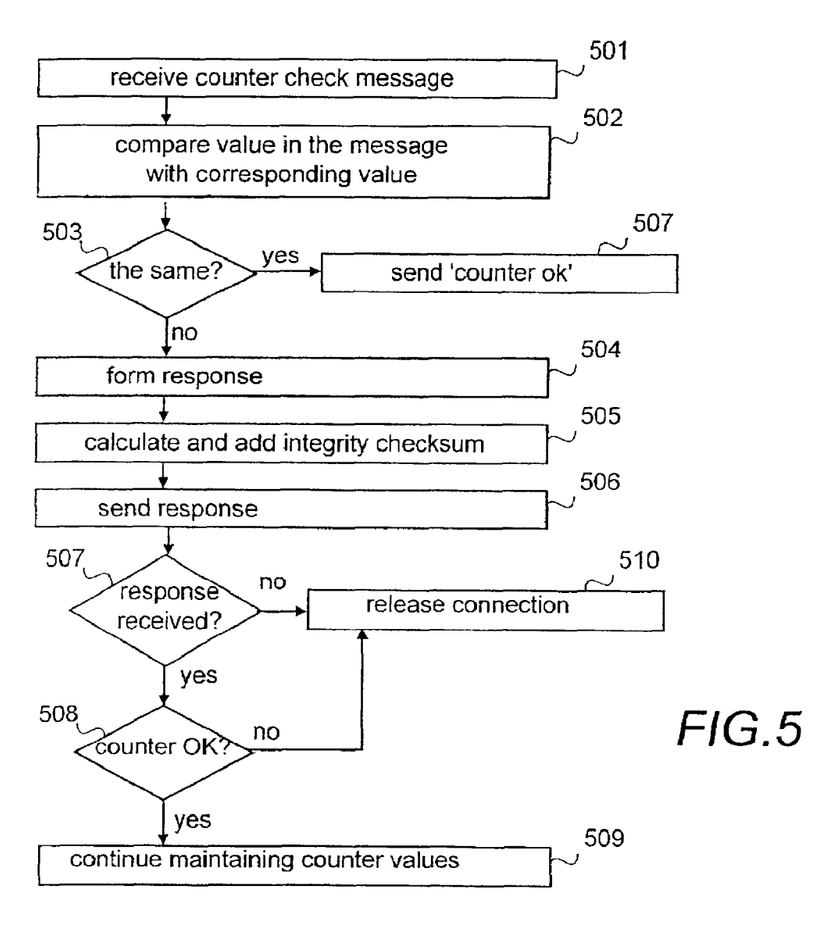
FIG. 5 is a flow chart illustrating the checking procedure in the user equipment in the first preferred embodiment of the invention.

A network node, comprising means for transmitting data according to prior art from or to user equipment (mobile station), is modified to implement the functions of the invention that are described in more detail in FIGS. 3, 4 and 5. The hardware configuration and basic operation of the network node do not have to be changed. Changes can be carried out as updated or added software routines and/or application-specific integrated circuit(s) (ASIC). Although the network node is preferably modified to implement the functions described in FIG. 3 with the functions of both FIGS. 4 and 5, the invention allows the implementation of either the functions described ine FIG. 4 or the functions described in FIG. 5 with the functions of FIG. 3.

User equipment (mobile station), comprising means for sending and receiving data according to prior art, is modified to implement the functions of the invention that are described in more detail in FIGS. 3, 4 and 5. The hardware configuration and basic operation of the user equipment (mobile station) do not have to be changed. Changes can be carried out as updated or added software routines and/or application-specific integrated circuit(s) (ASIC). Although the user equipment (mobile station) is preferably modified to implement the functions described in FIG. 3 with the functions of both FIGS. 4 and 5, the invention allows the implementation of either the functions described in FIG. 4 or the functions described in FIG. 5 with the functions of FIG. 3.

Figure 2:
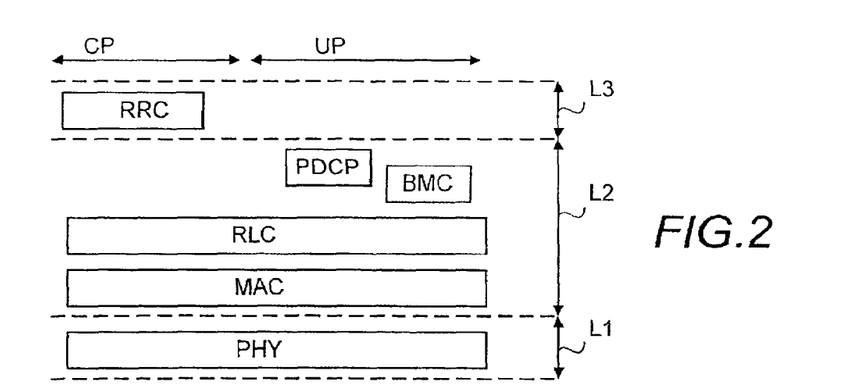
FIG. 2 illustrates protocol stacks.

Since the implementation of the present invention relates to the functions and processing of the protocols used in an air interface, we shall now study an example of how the necessary protocol stacks can be implemented. FIG. 2 illustrates a radio interface protocol stack according to 3GPP specifications. The protocol entities described here will operate between a mobile station and a base station BS or a radio network controller RNC. The division of protocol layers between BS and RNC is not described here, since it is not relevant to the invention.

The radio interface protocols can be divided into a control plane CP and a user plane UP. The control plane is used for all signalling between MS and RNC, and also between MS and CN. The user plane carries the actual user data. Some of the radio interface protocols operate only in one plane, some protocols operate in both planes.

The protocol stacks are divided into layers, which are layer one L1 (also called the physical layer), layer two L2 (also called the data link layer) and layer three L3 (also called the network layer). Some layers contain only one protocol, some layers contain several different protocols. Each unit, for example the mobile station and RNC, has a layer which is in logical communication with a layer of another unit. The communication is known as peer-to-peer communication. Only the lowest, physical layers communicate with each other directly. The other layers always use the services offered by the next, lower layer. The message must thus physically pass in the vertical direction between the layers, and only in the lowermost layer the message Passes horizontally between the layers.

The physical layer includes all the schemes and mechanisms used to make communication possible on the radio channel. These mechanisms include, for example, modulation, power control, coding and timing. Wide band CDMA (WCDMA) and time division CDMA (TD-CDMA) are mentioned as examples of multiple access methods which can be used in the radio interface. The physical layer offers services to the Medium Access Control (MAC) protocol via transport channels that are characterised by how and with what characteristics data is transferred.

The data link layer L2 between the mobile station MS and RNC or BS uses a radio link control RLC protocol and the medium access control MAC. The radio link control RLC provides a radio-solution-dependent reliable link over the radio path. The RLC offers services to higher layers via service access points (SAPs), which describe how the RLC handles the data packets and if e.g. the automatic repeat request (ARQ) function is used. On the control plane, the RLC services are used by the RRC protocol for signalling transport. Normally a minimum of three RLC entities are engaged to signalling transport—one transparent, one unacknowledged and one acknowledged mode entity. On the user plane, the RLC services are used either by the service specific protocol layers PDCP or BMC or by other higher layer user plane functions (e.g. speech codec). The RLC services are called Signalling Radio Bearers in the control plane and Radio Bearers in the user plane for services not utilizing the PDCP or BMC protocols.

The MAC protocol offers services to the RLC protocol by means of logical channels. The logical channels are characterized by what type of data is transmitted In the MAC layer the logical channels are mapped to the transport channels.

The Packet Data Convergence Protocol (PDCP) exists only for the PS domain services (services routed via the SGSN) and its main function is header compression, which means compression of redundant protocol control information (e.g., TCP/IP and RTP/UDP/IP headers) at the transmitting entity and decompression at the receiving entity. The services offered by PDCP are called Radio Bearers.

The Broadcast Multicast Control protocol (BMC) exists only for the SMS Cell Broadcast service, which is derived from GSM. The service offered by the BMC protocol is also called a Radio Bearer.

The RRC protocol offers services to higher layers (to the Non Access Stratum) via service access points. All higher layer signalling between MS and CN (mobility management, call control, session management, etc.) is encapsulated into RRC messages for transmission over the radio interface.

The control interfaces between RRC and all the lower layer protocols are used by the RRC protocol to configure characteristics of the lower layer protocol entities including parameters for the physical, transport and logical channels. The same control interfaces are used by the RRC layer for example to command the lower layer protocols to perform certain types of measurements and by the lower layer protocols to report measurement results and errors to RRC.

The intruder must monitor the RRC signalling in the 'passive mode' so that he can modify his own protocol stacks when changes between a legitimate mobile station and radio network occur. After the intruder has sent his first data packet using an existing radio bearer, he must take a more active role with respect to data sent in this radio bearer. More specifically, he must modify all data packet (PDCP and RLC) headers between the legal peer entities (mainly data PDU numbers).

FIG. 3 illustrates the functionality of user equipment (mobile station) and a network infrastructure according to the invention during a connection using unciphered transmission in air interface. It is assumed that the functionality in the network infrastructure is implemented in RNC.

FIG. 3 starts in a situation where the RRC connection has been established between MS and RNC. A radio bearer is set up, in step 301, for the connection. Depending on the services, information in UMTS can usually be transmitted using one or more radio bearers, i.e. one or more radio bearers are set up during a connection. The amount of radio bearers may also vary, since radio bearers may be released or set up during the RRC connection between user equipment (mobile station) and RNC.

While the radio bearer is set up also the counters are taken into use in step 302. In the example illustrated in FIG. 3 there are two counters for one radio bearer: one counter for the uplink direction and one counter for the downlink direction. The counter values are maintained, in step 303, as long as the radio bearer is active, i.e. not released. In other words when in the network infrastructure a packet is received from MS (or from the intruder acting as MS) or sent towards MS (although the intruder can filter it) the value of the corresponding counter is updated in the network infrastructure. Correspondingly, when MS sends or receives a packet, the value of the corresponding counter is updated in MS.

In another embodiment of the invention there is only one counter for one connection. The counter may use the above mentioned counters for radio bearers as subcounters.

In another embodiment of the invention there are two counters for one connection: one counter for the downlink direction and one counter for the uplink direction. The counters may use the above mentioned counters for radio bearers as subcounters.

In the first preferred embodiment of the invention there are two counters for each radio bearer. Each counter consists of a message sequence number as the least significant part and a Hyper Frame Number HFN as the most significant part. The message sequence number depends on the protocol layer. Preferably, the message sequence number is an RLC PDU sequence number. The advantage of using the RLC PDU sequence number and HFN is that they are already implemented in MS and RNC, since they are used for the ARQ function in RLC layer and also as input for the ciphering algorithm.

The counter (or subcounter) can count also something else, for example the total amount of data transmitted, the amount of data transmitted after the previous 'counter check' message (described in FIG. 4), the number of packets or PDU numbers transmitted. The counter may use modulo arithmetic. It is only essential that a counter value indicates reliably enough the amount of data (or data packets) transmitted. In other words, a difference between a counter value in user equipment (mobile station) and a counter value on the network side is sufficient if the intruder transmits his/her own packets between 'legal' packets.

The checking procedure in the first preferred embodiment of the invention is described in more detail in FIGS. 4 and 5. The messages sent and received in the checking procedure are signalling messages. For example in UMTS all signalling messages are integrity protected. For the sake of clarity it is assumed in FIGS. 4 and 5 that a signalling message cannot be taken as a received message if the integrity protection check is not passed, i.e. if the intruder has tried to modify the message. Naturally, if the intruder filters signalling messages, they cannot be received by the legal entities, which in the first preferred embodiment are a mobile station MS and a radio network controller RNC.

FIG. 4 illustrates the functions of RNC serving the mobile station in the first preferred embodiment of the invention In the first preferred embodiment of the invention the periodic checking procedure is triggered in RNC. RNC represents in the first preferred embodiment the network infrastructure, i.e. the network side. In other embodiments of the invention some other network node, for example a base station or a SGSN, can perform the functions described below as the functions of RNC.

RNC is monitoring, in step 401, each counter value of the connection. In the first preferred embodiment of the invention each active radio bearer has two counters (uplink and downlink) and thus two counter values to monitor and each radio bearer is monitored. During monitoring, i.e. when the value of one counter changes, RNC checks, in step 402, if a predetermined checking value CV is encountered. In the first preferred embodiment, the checking value indicates the number of packets transmitted between two checking procedures in succession. In some other embodiments the checking value may be a treshold. The treshold can indicate how much the counter value can increase after the previous checking procedure has been triggered. The checking value can be for example a RLC PDU number range. The checking value may be defined freely on the network side and it can even be changed during monitoring. In the embodiments where the counter values are monitored, the choice of appropriate checking value is usually affected by what kind of a counter is used and e.g. the PDU size, bit rate, Quality of Service class etc.

If the checking value CV is not encountered (step 402), RNC continues monitoring.

If the checking value is encountered, RNC forms, in step 403, a 'counter check' message CCM. In the first preferred embodiment of the invention the 'counter check' message contains the most significant part of the counter value of each counter, i.e. HFN. In some other embodiments of the invention, the 'counter check' message contains only a checksum, or some other corresponding 'total', calculated over the counter value(s), i.e. over a bit string formed by the counter values from each active radio bearer. The checksum is preferably a message authentication code MAC-I calculated using the integrity protection algorithm.

When the 'counter check' message is ready, RNC calculates, in step 404, an integrity checksum. In the first preferred embodiment of the invention the integrity algorithm is f9 and the input parameters for it are: a secret integrity key which is derived during the authentication and key agreement procedure; a direction bit (uplink or downlink); a fresh which is a random value chosen by the network; the RRC message itself (i.e. counter check message in this case) and a COUNT value which is a sequence number maintained by MS between different connections that are integrity protected using the same integrity key IK. The COUNT value consists of Hyper Frame Number (HFN-I) and RRC message sequence number. The integrity algorithm may also require a 'radio bearer'-specific input parameter, a radio bearer id for example. When the integrity checksum is calculated, RNC adds, in step 404, the integrity checksum to the 'counter check' message and sends, in step 405, the message to the mobile station MS.

After sending the 'counter check' message, RNC waits for a response in step 406 for predetermined time, the time being specified in the protocol standard. As stated above, when RNC receives a signalling message, it calculates an integrity checksum over it and compares the calculated checksum with the checksum added in the message and only if they match, RNC considers the signalling message as a received one. However, these steps are not shown in FIG. 4.

If the response is received (step 406), RNC checks, in step 407, if the response was a 'counter ok' message, i.e. a message indicating that the counter values in MS are the same as in RNC and RNC, continues by monitoring counter values (step 401).

If the response was not a 'counter ok' message (step 407), it is in the first preferred embodiment of the invention a response containing all counter values maintained for the connection in MS. The counter values are preferably indicated in the response message by the most significant part of the counter value of each counter, i.e. HFNs. RNC compares, in step 408, each counter value in the response with a corresponding counter value maintained by it. Thus RNC rechecks its counter values. If there is no difference (step 409), RNC sends, in step 412, a 'counter ok' signalling message to MS and continues by monitoring counter values (step 401). The counter ok message is an integrity protected message.

If there is a difference (step 409), RNC has to decide if the difference is acceptable (step 410). A slight difference in counter values may result from synchronization: there is a small time difference between the counter value checks on each side. In other words, one side may have sent a packet which the other side has not yet received. During that time interval also the most significant part of some counter value may change. If the difference is acceptable (step 410), the procedure continues in step 412 by RNC sending the 'counter ok' message. If the difference is not acceptable, RNC releases, in step 411, the connection. The connection is preferably released by integrity protected signalling messages, or at least the first message indicating that the connection has to be released must be integrity protected. The connection can also be cut off without signalling.

The connection is also released if RNC does not receive any response (step 406) during the predetermined time. So if the intruder filters the 'check counter' message the connection will be released.

In the second preferred embodiment of the invention the periodic checking procedure can also be triggered in MS. When the periodic checking procedure is triggered in MS, MS performs the functions of RNC described above (and sends the messages to RNC). In the second preferred embodiment of the invention, when MS notices that the checking value is encountered (step 402), MS waits for a predetermined time for a 'counter check' message from RNC If MS does not receive the 'counter check' message during the predetermined time period, MS triggers the checking procedure by forming itself the 'counter check' message (step 403). In some other embodiments MS does not perform this additional step between steps 402 and 403.

In embodiments where MS can trigger the periodic checking procedure the network preferably signals the checking value at the beginning of the connection to MS This signalling must be integrity protected. It is also possibly that the checking value is a fixed value already in MS.

In some other embodiments of the invention, each radio bearer may monitored as a whole, i.e. not monitoring the uplink and downlink directions separately. It is also possible to monitor the connection as a whole, i.e not monitor each radio bearer separately. The latter can be implemented also by monitoring uplink and downlink separately.

In other embodiments of the invention instead of monitoring counter value(s), the time passed from the sending of the previous counter check message or from triggering the checking procedure is monitored. In the embodiments the checking value indicates the time interval between two checking procedures. The time interval does not have to be a constant, it may also be generated e.g. by a random number generator or by some other methods producing non-constant values. The time intervals can also be fixed, non-constant intervals. When the time interval has passed, the 'counter check' message is formed (step 403).

In one embodiment of the invention the checking value is decreased in response to an acceptable difference, thus triggering the checking procedure sooner in these 'suspicious' situations where there might be an intruder. When there is no difference between the counter values maintained in MS and RNC, the checking value is restored.

FIG. 5 illustrates the functions of the mobile station MS in the first preferred embodiment of the invention when the periodic checking procedure is triggered in RNC.

MS receives, in step 501, a 'counter check' message from RNC. As stated above, when MS receives a signalling message, such as the 'counter check' message, it calculates an integrity checksum over it and compares the calculated checksum with the checksum added in the message and only if they match does MS consider the signalling message as a received one. However, these steps are not shown in the FIG. 5.

In the first preferred embodiment of the invention the 'counter check' message contains the most significant part of the counter value of each counter maintained by RNC. MS compares, in step 502, each counter value in the 'counter check' message to a corresponding counter value maintained by MS If the values are the same (step 503), MS sends, in step 507, a 'counter ok' message to RNC. The 'counter ok' message is an integrity protected message.

If one or more values are not the same as the corresponding value(s) (step 503), MS forms, in step 504, a response. The response contains the most significant part of the counter value of each counter maintained by MS for this connection.

When the response is ready, MS calculates, in step 505, an integrity checksum as described above in FIG. 4 and adds it, in step 505, to the response and sends, in step 506, the message to RNC.

After sending the response MS waits for a response from RNC in step 507 a predetermined time. The time is specified in the protocol standard. The response from RNC is also an integrity protected signalling message. If the response from RNC is received (step 507), MS checks, in step 508, if the response was a 'counter ok' message, i.e. a message indicating that the counter values in MS are the same as in RNC. If the message was a 'counter ok' message, MS continues by monitoring counter values (step 509).

If the response was not a 'counter ok' message (step 507) but instead a release connection message, MS releases, in step 510, the connection. This release procedure may include a response message from MS to RNC before the actual release operation.

If MS does not receive the response from RNC during the predetermined time (step 507), MS releases the connection (step 508) locally.

In some other embodiments the response formed in step 504 contains only the counter values of counters which were not the same.

In some other embodiments the response formed in step 504 contains the whole counter values (not only the most significant bits).

In embodiments where the counter check message contains a checksum or a corresponding total, MS calculates a corresponding checksum or total and compares it with the one in the message in step 502.

In another embodiment of the invention when the counter values are not the same (step 503) MS releases the connection. In other words the steps 504-509 are skipped. In the embodiment also steps 408-410 and 412 in FIG. 4 are skipped.

In embodiments where MS can trigger the checking procedure, RNC performs the functions of MS described in FIG. 5.

In some embodiments of the invention the information or part of the information is not changed, during the checking procedure, in separate signalling messages as is the case in FIGS. 4 and 5. In the embodiments the counter value(s) (or corresponding indicator(s)) and/or comparison result(s) are added to prior art integrity protected signalling messages sent between MS and RNC.

In one embodiment of the invention based on the above embodiment utilizing prior art integrity protected signalling messages, RNC (or MS) waits after encountering the checking value for the integrity protected signalling message, to which RNC (or MS) adds the counter value(s). The waiting time of the next integrity protected signalling message can be controlled by a separate timer. The separate timer defines the maximum allowed waiting time after encountering the checking value, before a prior art integrity protected signalling message has to be sent If no prior art integrity protected signalling message is sent during the allowed waiting time, the separate signalling messages described in FIGS. 4 and 5 will be used. In this embodiment the counter value(s) (or corresponding indicator(s)) and/or comparison result(s) to be sent are those values that exist at the time of sending the actual integrity protected signalling message (not the values that existed when the checking value was encountered) Instead of the separate timer, an additional counter can also be used in this embodiment. The triggering value for this additional counter defines preferably the maximum allowed number of transmitted data packets after encountering the checking value, before a prior art integrity protected signalling message must be sent. Thus the allowed waiting time varies. The triggering value for this additional counter can also for example define the maximum allowed number of received (or sent) data packets after encountering the checking value, before a prior art signalling message must be sent. Alternatively, both the additional counter and the separate timer can be used together in which case the one that expires earlier defines the maximum waiting time.

The prior art signalling messages cover here all signalling messages that are sent for some other reason than transmitting only the information needed in the checking procedure.

The steps shown in FIGS. 3, 4 and 5 are not in absolute chronological order and some of the steps may be performed simultaneously or differing from the given order. Other functions can also be executed between the steps. Some of the steps can also be left out. For example, in some embodiments of the invention when there is a difference in counter values, it is not checked whether the difference is acceptable or not (step 410 in FIG. 4), but the difference causes the connection to be released. The signalling messages are only exemplary and may even comprise several separate messages for transmitting the same information. In addition, the messages can also contain other information. Furthermore, the names of the messages may differ from the above-mentioned ones.

The embodiments or parts of the embodiments described above may be freely combined in order to create new embodiments of the invention.

The invention was described above by means of embodiments using a non-transparent mode of the retransmission protocol RLC, which is the case for most packet data services. However, the invention can also be applied in conjunction with other protocols and with circuit-switched connections.

The invention was described above assuming that the air interface exists between the network infrastructure and the user equipment. The air interface may exist also between two network nodes.

Although the invention was described above in a wireless communication system, the invention can also be applied to fixed systems.

It is to be understood that the above description and the related figures are only intended to illustrate the present invention. It will be obvious to a person skilled in the art that the invention may be modified in different ways without deviating from the scope and spirit of the invention disclosed in the appended claims.

The invention claimed is:

1. A method, comprising:
    maintaining in a network infrastructure a first indication of an amount of data transmitted over a connection in a communication system;
    maintaining in an apparatus a second indication of the amount of data transmitted over the connection;
    triggering, in response to encountering a predetermined checking value, a checking procedure to find out whether or not the connection is used by an intruder, the checking procedure utilizing integrity protected signalling messages and the first and second indications;
    transmitting at least one of the first and second indications in an integrity protected signalling message during the checking procedure between the apparatus and the network infrastructure;
    verifying the integrity of the integrity protected signalling message; and
    comparing, in response to the integrity being verified, the first indication with the second indication during the checking procedure.

2. A method according to claim 1, the method further comprising:
    continuing the connection and the maintenance of the first indication and the second indication if the first indication and the second indication are the same.

3. A method according to claim 2, the method further comprising:
  triggering the checking procedure in the network infrastructure;
  sending the first indication to the apparatus;
  comparing the first indication with the second indication in the apparatus; and
  if the first indication and the second indication are not the same:
    sending the second indication from the apparatus to the network infrastructure;
    rechecking the first indication;
    comparing the rechecked first indication with the received second indication; and
    releasing the connection if the rechecked first indication and the received second indication are not the same.

4. A method according to claim 2, the method further comprising:
  triggering the checking procedure in the network infrastructure;
  sending the first indication to the apparatus;
  comparing the first indication with the second indication in the apparatus; and
  if the first indication and the second indication are not the same:
    sending the second indication from the apparatus to the network infrastructure;
    rechecking the first indication;
    comparing the rechecked first indication with the received second indication; and
    if the rechecked first indication and the received second indication are not the same:
      checking if a difference between the rechecked first indication and the received second indication is acceptable; and
      releasing the connection only if the difference is not acceptable.

5. A method according to claim 4, the method further comprising:
  decreasing the checking value if the difference between the rechecked first indication and the received second indication is acceptable.

6. A method according to claim 2, the method further comprising:
  triggering the checking procedure in the apparatus;
  sending the second indication to the network infrastructure;
  comparing the first indication with the second indication in the network infrastructure; and
  if the first indication and the second indication are not the same:
    sending the first indication from the network infrastructure to the apparatus;
    rechecking the second indication;
    comparing the rechecked second indication with the received first indication; and
    releasing the connection if the rechecked second indication and the received first indication are not the same.

7. A method according to claim 2, the method further comprising:
  triggering the checking procedure in the apparatus;
  sending the second indication to the network infrastructure;
  comparing the first indication with the second indication in the network infrastructure; and
  if the first indication and the second indication are not the same:
    sending the first indication from the network infrastructure to the apparatus;
    rechecking the second indication;
    comparing the rechecked second indication with the received first indication; and
    if the rechecked second indication and the received first indication are not the same, the method further comprises:
      checking if a difference between the rechecked second indication and the received first indication is acceptable; and
      releasing the connection only if the difference is not acceptable.

8. A method according to claim 6, the method further comprising:
  waiting, in the apparatus, a predetermined time for a message from the network infrastructure, the message containing the first indication; and
  triggering the checking procedure in apparatus only if the message is not received within the predetermined time.

9. A method according to claim 1, wherein the predetermined checking value determines the amount of data transmitted between two checking procedures in succession.

10. A method according to claim 1, wherein the predetermined checking value determines the number of data packets transmitted between two checking procedures in succession.

11. A method according to claim 1, wherein the predetermined checking value determines a time interval between two checking procedures in succession.

12. A method according to claim 1, wherein the apparatus is one of the group of user equipment and a network node.

13. A communication system comprising:
  a network infrastructure;
  at least one apparatus; and
  a connection established between the apparatus and the network infrastructure; wherein
  the network infrastructure is configured to maintain a first indication of the amount of data transmitted over the connection;
  the apparatus is configured to maintain a second indication of the amount of data transmitted over the connection; and
  the network infrastructure is configured to trigger, in response to encountering a predetermined checking value, a checking procedure to find out whether or not the connection is used by an intruder, the checking procedure utilizing integrity protected signalling messages and the first and second indications, to transmit during the checking procedure at least one of the indications in an integrity protected signalling message between the apparatus and the network infrastructure; to verify the integrity of integrity protected signalling message; and in response to the integrity being verified to compare the first indication with the second indication during the checking procedure.

14. A system according to claim 13, wherein the network infrastructure is configured, on the basis of the comparison, to deduce whether or not to release the connection.

15. A system according to claim 13, wherein
  the network infrastructure is configured to trigger the checking procedure by sending the first indication to the apparatus in response to encountering the predetermined checking value; and to deduce on the basis of a response received from the apparatus whether or not to release the connection; and the apparatus is configured in response to receiving the first indication to compare the first indication with the second indication; and send a response indicating a comparison result to the network infrastructure.

16. A system according to claim 13, wherein the apparatus is configured to trigger the checking procedure by sending the second indication to the network infrastructure in response to encountering the predetermined checking value; and to deduce on the basis of a response received from the network infrastructure whether or not to release the connection; and the network infrastructure is configured in response to receiving the second indication to compare the first indication with the second indication; and send a response indicating a comparison result to the apparatus.

17. A system according to claim 16, wherein the apparatus is configured to wait a predefined time for a message from the network infrastructure, the message containing the first indication in response to encountering the predetermined checking value; and to send the second indication to the network infrastructure only if no message is received during the predefined time.

18. A system according to claim 13, wherein if the first indication and the second indication are not the same, the system is configured to recompare the indications and on the basis of the recomparison to deduce whether or not to release the connection.

19. A system according to claim 13, wherein:

the network infrastructure is configured to maintain a first counter value indicating the amount of data transmitted and the first indication indicates the first counter value indirectly;

the apparatus is configured to maintain a second counter value indicating the amount of data transmitted and the second indication indicates the second counter value indirectly; and if the first indication and the second indication are not the same, the network infrastructure is configured to compare the first counter value with the second counter value and on the basis of this comparison to deduce whether or not to release the connection.

20. A system according to claim 13, wherein the apparatus is one of the group of user equipment and a network node.

* * * * *